United States Patent [19]
Nokubo et al.

[11] Patent Number: 5,413,406
[45] Date of Patent: May 9, 1995

[54] FLUID PRESSURE CONTROL DEVICE HAVING CHANGEOVER AND ELECTROMAGNETIC VALVES HAVING A COMMON SLEEVE

[75] Inventors: Seiji Nokubo; Teruhisa Kohno; Tsuyoshi Fujimoto, all of Itami, Japan

[73] Assignee: Sumitomo Electric Industries, Ltd., Osaka, Japan

[21] Appl. No.: 245,660

[22] Filed: May 18, 1994

[30] Foreign Application Priority Data

May 21, 1993 [JP] Japan ............................ 5-026655 U

[51] Int. Cl.⁶ .......................................... F16K 31/00
[52] U.S. Cl. .................. 303/119.2; 303/117.1; 137/596.17; 251/129.15
[58] Field of Search ............... 303/119.2, 117.1, 115.2; 251/129.15; 137/596.17

[56] References Cited

U.S. PATENT DOCUMENTS 4,915,459 4/1990 Hashida et al. ................. 303/119.2
5,094,512 3/1992 Kohno et al. ................... 303/117.1
5,299,859 4/1994 Tackett et al. .................. 303/119.2

FOREIGN PATENT DOCUMENTS

80/01783 9/1980 WIPO .

*Primary Examiner*—Matthew C. Graham
*Attorney, Agent, or Firm*—Wenderoth, Lind & Ponack

[57] ABSTRACT

A fluid pressure control unit has a changeover valve and an electromagnetic discharge valve combined with each other so that with the opening and closing of the latter valve, the communication between the inlet leading to the pressure source and the first and second outlets leading to wheel brakes is changed over for normal braking, pressure reduction for antilock control and pressure reincrease. Part of the sleeve of the changeover valve is used as the frame of the discharge valve which functions as a magnetic circuit. This reduces the number of parts, eliminates the need for an O-ring and facilitates maintenance.

4 Claims, 3 Drawing Sheets

FLUID PRESSURE CONTROL DEVICE HAVING CHANGEOVER AND ELECTROMAGNETIC VALVES HAVING A COMMON SLEEVE

BACKGROUND OF THE INVENTION

This invention relates to a fluid pressure control device for a wheel brake which has a small number of components and can be assembled easily.

FIG. 3 shows a conventional fluid pressure control device. Numeral 1 in the figure designates a changeover valve having flow rate control function. Numeral 2 designates an electromagnetic discharge valve. The changeover valve 1 comprises a cylindrical sleeve 4 inserted in a bore formed in a housing 3, a spool 5 slidably mounted in the sleeve 4, and a return spring 6 urging the spool 5 in one direction.

The sleeve 4 has an inlet port 4a communicating with a pressure source (a master cylinder and a pump; neither is shown) and first and second outlet ports 4b and 4c communicating with wheel brakes (not shown).

The spool 5 has a fluid passage 5a therein which places an input chamber 7, in which the front end of the spool is disposed, in communication with a pressure reduction chamber 8, in which the rear end of the spool is disposed, by way of an orifice 9. When the spool 5 is in the illustrated position, i.e. when it is at the extreme end of its movement toward the input chamber 7, fluid from the inlet port 4a passes to the first outlet port 4b without going through the orifice 9. As the spool 5 moves toward the pressure reduction chamber 8, fluid communication between the inlet port 4a and the first outlet port 4b is cut off, while the second outlet port 4c, which has been closed, is brought into communication with the pressure reduction chamber 8 through a groove formed in the outer periphery of the spool 5.

The discharge valve 2 has a frame 10 made of a magnetic material and inserted into the bore of the housing 3 so that it engages the rear end of the sleeve 4 with a liquid-tight seal therebetween. The discharge valve 2 has a fixed valve seat 11 provided in the frame 10 which serves as a magnetic circuit, and a valve member in the form of an armature 14 and valve body 15. By activating a solenoid coil 12, the armature 14, which is biased by a spring 13, is pulled by the magnetic force produced by the coil 12, so that the valve body 15 provided on the front end of the armature moves away from the fixed valve seat 11. The pressure reduction chamber 8 is thus brought into communication with a discharge port 16.

In an ordinary braking mode, the fluid pressures in the input chamber 7 and the pressure reduction chamber 8 are equal to each other, so that the spool 5 is maintained in its original position by the force of the spring 6. Thus, brake fluid is freely movable between the pressure source and the wheel brakes through the fluid passage at a high flow rate.

On the other hand, if the discharge valve 2 is opened in response to a pressure reduction signal for antilock control, the pressure in the pressure reduction chamber 8 will drop. Thus, a difference in fluid pressure will be created between the input chamber 7 and the pressure reduction chamber 8 due to the orifice. This differential pressure moves the spool 5 toward the pressure reduction chamber 8 while compressing the spring 6. Thus, the first outlet port 4b is closed, while the wheel brakes are brought into communication with the discharge port 16 by way of the second outlet port 4c and the pressure reduction chamber 8.

When the discharge valve 2 is closed in response to pressure re-increase signals in the antilock control mode, the spool 5 tends to move to the position where the pressures on both ends thereof balance with each other and returns to a position where the inlet 4a opens a little. In this position, the first outlet port 4b is still closed and the second outlet 4c communicates with the pressure reduction chamber 8. Thus, if the fluid pressure at the inlet 4a is higher than the fluid pressure in the wheel brakes, brake fluid will flow with a low flow rate from the inlet 4a toward the wheel brakes through the orifice 9 and the second outlet 4c. When the difference in pressure between the inlet 4a and wheel brakes decreases below a predetermined value, the spool 5 returns to its original position, so that the inlet 4a is again brought into fluid communication with the first outlet 4b. The abovementioned function of the fluid pressure control device is described in detail in U.S. Pat. No. 4,915,459.

In such a conventional fluid pressure control device, the changeover valve 1 and the discharge valve 2 are separate members and are connected together liquid-tightly in the bore of the housing 3. This control device thus requires a large number of parts and complicated assembling, which are major causes of low productivity.

Also, the use of an O-ring 17 to provide a liquid-tight seal between the sleeve 4 and the frame 10 is not desirable for long-term reliability of the liquid-tight seal and maintenance.

SUMMARY OF THE INVENTION

An object of the present invention is to provide a fluid pressure control device which solves these problems.

According to this invention, part of the cylindrical sleeve of the changeover valve is used as the frame of the discharge valve in which the fixed valve seat is mounted. Namely, the sleeve having the inlet and the first and second outlets is made of a magnetic material and has a rearward extension used as the frame of the discharge valve.

The fixed valve seat of the discharge valve is preferably press-fitted in the sleeve. It is possible to further reduce the number of parts if the return spring of the changeover valve is supported on the fixed valve seat of the discharge valve.

Since part of the sleeve is used as the frame of the discharge valve, there is no need to separately prepare a frame. The O-ring 17 shown in FIG. 3 is not needed, either. In order to further facilitate the assembling of the device, the changeover valve and the discharge valve may be mounted in the housing after assembling them into a single unit.

According to the present invention, since part of the sleeve is used as the frame of the discharge valve, the number of parts is few and the machining and assembling operations therefor are relatively simple. This makes it possible to increase productivity while reducing the production cost.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
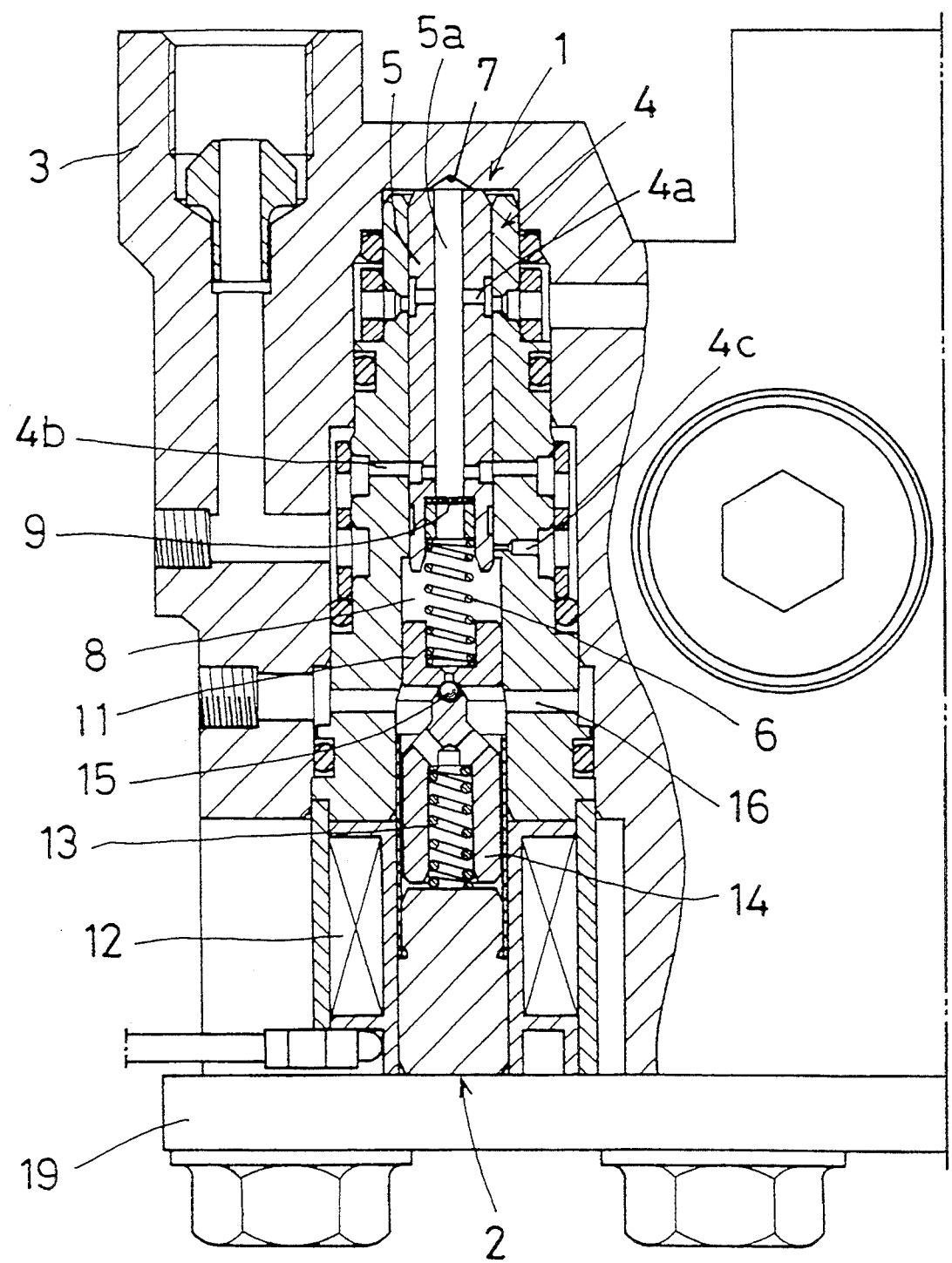
FIG. 1 is a sectional view of one embodiment of the fluid pressure control device according to the present invention.

FIG. 1 shows one embodiment of the present invention. The sleeve 4 of this fluid pressure control device extends rearwardly to form a rear extension contacting the bobbin of the solenoid coil 12. This rear extension is used as the frame of the discharge valve 2. Since the frame of the discharge valve 2 forms a part of the magnetic circuit, the sleeve 4 has to be made of a magnetic material.

The fixed valve seat 11 of the discharge valve 2 is formed as a separate part from the sleeve 4 and is press-fitted in a hole in the sleeve. It is thus possible to freely select the gap that will be formed between the valve body 15 and the fixed valve seat 11 when the valve is opened (i.e. the degree of opening of the discharge valve 2). Thus, it is also possible to set the gap with high accuracy irrespective of the machining accuracy of the parts.

Figure 2:
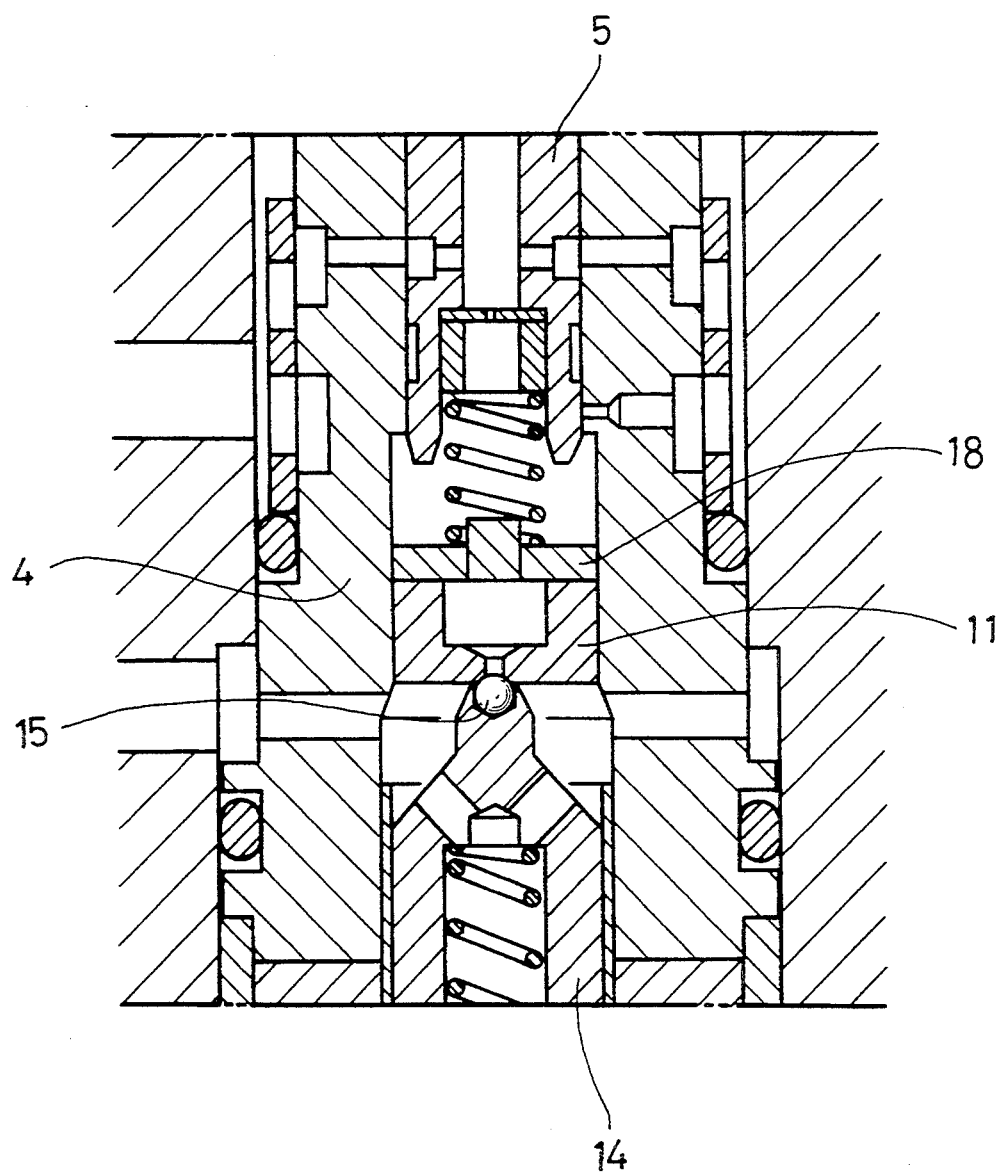
FIG. 2 is a sectional view of another embodiment in which the spring is supported in a different way.

In this embodiment, in order to minimize the number of parts, the return spring 16 is supported on the fixed valve seat 11. But as shown in FIG. 2, the return spring 6 may be supported on a spring holder 18 provided in the sleeve 4. Numeral 19 designates a seating plate bolted to the housing 3 to hold the discharge valve 2 and prevent the changeover valve 1 and discharge valve 2 from coming out of the bore in the housing 3.

Figure 3:
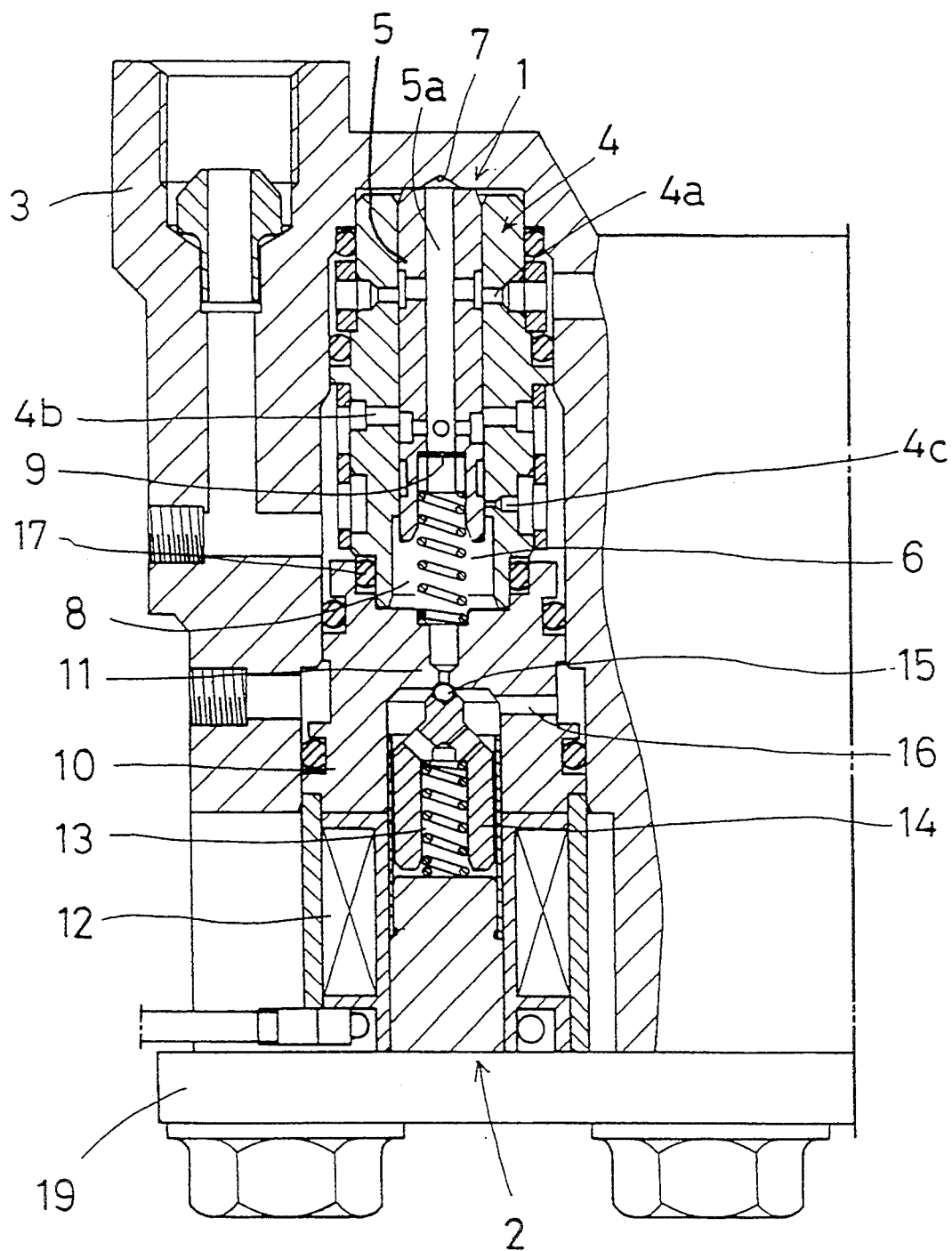
FIG. 3 is a sectional view of a conventional fluid pressure control device.

Otherwise, the device according to the present invention is structurally the same as the device shown in FIG. 3. Thus, the same elements are denoted by the same numerals and their description is omitted.

What is claimed is:

1. A fluid pressure control device comprising: an input chamber; a pressure reduction chamber; a changeover valve including a one-piece cylindrical sleeve of a magnetic material and having an inlet port, a first outlet and a second outlet, a spool slidably mounted in said sleeve, said spool having a fluid passage through which said input chamber and said pressure reduction chamber communicate via an orifice, one end of said spool confronting said input chamber and the other end of said spool confronting said pressure reduction chamber such that pressure in said chambers act on said ends of the spool, respectively, and a return spring biasing said spool in a direction toward said input chamber; and an electromagnetic discharge valve including a discharge port and a discharge passage leading from said pressure reduction chamber to said discharge port, and a valve member disposed in said sleeve, said valve member being movable in said sleeve between open and closed positions; said inlet port and said first outlet being connected, when said spool is biased by said return spring to an extreme position, by a portion of said fluid said fluid passage defined to one side of said orifice such that said inlet port communicates directly with said first outlet; said valve member opening said discharge passage when in said open position such that as the valve member of said discharge valve is moved to said open position, said spool is moved from said extreme position toward said pressure reduction chamber due to a pressure differential produced between said input chamber and said pressure reduction chamber, the fluid communication between said inlet port and said first outlet is cut off, and said second outlet communicates with said pressure reduction chamber; and when the valve member of said discharge valve is in said closed position and until said pressure differential decreases below a predetermined value, said second outlet remains in communication with said inlet through said orifice and said pressure reduction chamber.

2. A fluid pressure control device as claimed in claim 1, wherein said discharge valve further includes a fixed valve seat press-fitted in said sleeve at one end of said discharge passage.

3. A fluid pressure control device as claimed in claim 2 wherein said return spring is supported on said fixed valve seat.

4. A fluid pressure control device as claimed in claim 1, wherein said discharge port is provided in said one-piece sleeve.

* * * * *